(12) United States Patent
Kim et al.

(10) Patent No.: US 11,552,313 B2
(45) Date of Patent: Jan. 10, 2023

(54) FUEL CELL SYSTEM WITHOUT HIGH PRESSURE LINE OF HYDROGEN SUPPLYING SYSTEM AND CONTROL METHOD THEREOF

(71) Applicants: HYUNDAI MOTOR COMPANY, Seoul (KR); KIA MOTORS CORPORATION, Seoul (KR)

(72) Inventors: Chang Ho Kim, Yongin-si (KR); Ji Hyun Shim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 361 days.

(21) Appl. No.: 15/821,402

(22) Filed: Nov. 22, 2017

(65) Prior Publication Data

US 2018/0205101 A1  Jul. 19, 2018

(30) Foreign Application Priority Data

Jan. 16, 2017  (KR) .................. 10-2017-0006954

(51) Int. Cl.
*H01M 8/04082* (2016.01)
*H01M 8/04746* (2016.01)
(Continued)

(52) U.S. Cl.
CPC ... *H01M 8/04201* (2013.01); *H01M 8/04089* (2013.01); *H01M 8/04208* (2013.01);
(Continued)

(58) Field of Classification Search
CPC ......... H01M 8/04201; H01M 8/04089; H01M 8/04208; H01M 8/04388; H01M 8/04671;
(Continued)

(56) References Cited

U.S. PATENT DOCUMENTS

2006/0230679 A1* 10/2006 Matos Da Silva ....... F17C 9/02
48/174
2008/0014476 A1*  1/2008 Kratschmar ...... H01M 8/04686
429/513
2009/0246594 A1* 10/2009 Jufuku ................ H01M 8/2483
429/413

FOREIGN PATENT DOCUMENTS

JP    2005-216519 A    8/2005
JP    2009-191943 A    8/2009
(Continued)

OTHER PUBLICATIONS

Machine translation of JP 2009-191943 (Year: 2009).*

Primary Examiner — Bethany L Martin
Assistant Examiner — Kourtney R S Carlson
(74) Attorney, Agent, or Firm — Morgan, Lewis & Bockius LLP

(57) ABSTRACT a fuel cell system without a high pressure line of a hydrogen supplying system, including a gas charging line formed between a gas charging station and a high pressure vessel charged with gas by the gas charging station, and a gas supplying line formed between the high pressure vessel and a stack, includes: a regulator provided in the gas supplying line; a solenoid valve provided in the gas supplying line between the regulator and the high pressure vessel; and a check valve provided in a bypass line connecting one point of the gas supplying line between the regulator and the solenoid valve and one point of the gas charging line.

5 Claims, 5 Drawing Sheets

(51) Int. Cl.
*H01M 8/04089* (2016.01)
*H01M 8/0438* (2016.01)
*H01M 8/04664* (2016.01)

(52) U.S. Cl.
CPC ... *H01M 8/04388* (2013.01); *H01M 8/04671* (2013.01); *H01M 8/04753* (2013.01); *H01M 2250/20* (2013.01); *Y02T 90/40* (2013.01)

(58) Field of Classification Search
CPC ......... H01M 8/04753; H01M 8/04104; H01M 8/04082
USPC ....................................................... 429/444
See application file for complete search history.

(56) References Cited

FOREIGN PATENT DOCUMENTS

| | | |
|---|---|---|
| JP | 2011-034916 A | 2/2011 |
| KR | 10-2006-0130957 A | 12/2006 |
| KR | 10-2013-0054376 A | 5/2013 |
| KR | 10-2014-0142404 A | 12/2014 |
| WO | 2011-010367 A1 | 1/2011 |

* cited by examiner

FUEL CELL SYSTEM WITHOUT HIGH PRESSURE LINE OF HYDROGEN SUPPLYING SYSTEM AND CONTROL METHOD THEREOF

CROSS-REFERENCE TO RELATED APPLICATION

This application is based on and claims the benefit of priority to Korean Patent Application No. 10-2017-0006954 filed on Jan. 16, 2017 with the Korean Intellectual Property Office, the disclosure of which is incorporated herein in its entirety by reference.

TECHNICAL FIELD

The present disclosure relates to a structure capable of minimizing a high pressure line in a hydrogen supplying system including a gas supplying line and a gas charging line in a vehicle to which a fuel cell system may be mounted. More particularly, the present disclosure relates to a fuel cell system and a control method thereof, in which a hydrogen supplying system of the fuel cell system includes a regulator providable on a gas supplying line extended from a high pressure vessel, a solenoid valve providable between the high pressure vessel and the regulator, and a check valve connecting the gas supply line and a gas charging line between the regulator and the solenoid valve. When the gas charging line is in a high pressure state, the check valve is opened so that high pressure states of the gas charging line and the gas supplying line between the regulator and the solenoid valve may be removed, thereby decreasing leak points generable in the hydrogen supplying system of the fuel cell system.

BACKGROUND

In general, a fuel cell system is formed of a fuel cell stack generating electric energy, a fuel supplying system supplying fuel (e.g., hydrogen, etc.) to the fuel cell stack, an air supplying system supplying air (e.g., oxygen, etc.), which is an oxidizing agent required for an electrochemical reaction in the fuel cell stack, a heat and water management system controlling an operation temperature of the fuel cell stack, and the like. High pressure compressed hydrogen with a high pressure of approximately 700 bars is stored in a high pressure vessel (hydrogen vessel) provided in the fuel supplying system, that is, a hydrogen supplying system, and the stored compressed hydrogen is discharged to a high pressure line according to on/off of a high pressure regulator mounted at an inlet part of the hydrogen vessel and then is decompressed while passing through a start valve and a hydrogen supplying valve to be supplied to the fuel cell stack.

The configuration from the high pressure vessel (or storage vessel) to the stack of the fuel cell system in this case will be described. Valve configurations of the regulator, a hydrogen blocking valve, and the hydrogen supplying valves, a pipe, through which hydrogen may flow, and various points for fitting the pipe may be formed. Air tightness of hydrogen flowing along the pipe is one of the most important performances related to safety of the hydrogen supplying system, further, the entire fuel cell system.

Accordingly, the high pressure, which is the same as the pressure of the vessel, is generally applied to the gas charging line connected from a receptacle of a gas charging station to the high pressure vessel or the gas supplying line connected from the high pressure vessel to the regulator for decompression, as well as the inside of the high pressure vessel, and the respective lines are connected through fitting (fastening), so that a leak point may be formed by the high pressure applied to the connected portion. The high pressure leak point needs to continuously maintain air tightness even though a high pressure is continuously applied, and as a result, durability is inevitably degraded. Accordingly, when the hydrogen supplying system of the fuel cell system is designed, there is a need for a robust design focusing on the leak point of the high pressure gas charging line and/or the gas supplying line. Further, the hydrogen supplying system has been designed in a direction of decreasing the high pressure leak point.

The above information disclosed in this Background section is only for enhancement of understanding of the background of the present disclosure and therefore it may contain information that does not form the prior art that is already known in this country to a person of ordinary skill in the art.

SUMMARY

In order to solve the above problem, when an in-tank regulator or an on-tank regulator, in which a high pressure solenoid valve and a regulator for decompression are integrated, is applied, a high pressure of a gas supplying line may be naturally removed. However, even in this case, a high pressure applied to a gas charging line connected from a gas charging station, particularly, a receptacle of the gas charging station, to a high pressure vessel, is not still removed and is left. Accordingly, the present disclosure has been made in an effort to solve the above-described problems associated with prior art, and provides a structure, which removes even a high pressure applied to a gas charging line to remove high pressure regions of all of the gas supplying lines and/or the gas charging lines exposable to the outside, and a control method thereof.

In one aspect, the present disclosure provides a fuel cell system without a high pressure line of a hydrogen supplying system, the fuel cell system including a gas charging line formed between a gas charging station and a high pressure vessel charged with gas by the gas charging station, and a gas supplying line formed between the high pressure vessel and a stack, wherein the fuel cell system comprises: a regulator provided in the gas supplying line; a solenoid valve provided in the gas supplying line between the regulator and the high pressure vessel; and a check valve provided in a bypass line connecting one point of the gas supplying line between the regulator and the solenoid valve and one point of the gas charging line.

In a preferred embodiment, the fuel cell system may further include a pressure sensor fastened to the gas supplying line between the regulator and the solenoid valve.

In another preferred embodiment, the check valve may be a one-way valve.

In still another preferred embodiment, gas passing through the check valve may be movable only in a direction from the gas supplying line to the gas charging line.

In yet another preferred embodiment, after the high pressure vessel is charged with gas, the check valve may be opened and then, in sequence, closed before the solenoid valve is opened.

In still yet another preferred embodiment, the fuel cell system may further include leak points, wherein leak may happen, in a flow path of the gas supplying line between the stack and the regulator.

In a further preferred embodiment, the fuel cell system may further include leak points, wherein leaks may happen, in a flow path of the gas charging line between the gas charging station and the check valve.

In another aspect, the present disclosure provides a method of controlling a fuel cell system without a high pressure line of a hydrogen supplying system, the fuel cell system including a gas charging line formed between a gas charging station and a high pressure vessel charged with gas by the gas charging station, a gas supplying line formed between the high pressure vessel and a stack, a regulator provided in the gas supplying line, a solenoid valve provided in the gas supplying line between the regulator and the high pressure vessel, and a check valve provided in a bypass line connecting one point of the gas supplying line between the regulator and the solenoid valve and one point of the gas charging line, wherein the method comprises: step S100 of determining whether an ignition of a vehicle in which the fuel cell system is mountable is in an "on" state; step S200 of determining whether the high pressure vessel of the fuel cell system is charged by the gas charging station before the vehicle starts up; step S300 of measuring a pressure of the gas supplying line with a pressure sensor fastened to the gas supplying line between the regulator and the solenoid valve; step S400 of determining whether the check valve is opened according to the pressure of the gas supplying line; and step S500 of opening the solenoid valve when the check valve is opened in step S400 and then, in sequence, closed.

In a preferred embodiment, when the pressure of the gas supplying line is larger than a predetermined pressure in step S400, the check valve may be opened.

In another preferred embodiment, the method may further include when the check valve is opened in step S400, measuring a time taken for the pressure of the gas supplying line to reach a predetermined pressure in step S410 between step S400 and step S500.

In still another preferred embodiment, when the time taken for the pressure of the gas supplying line to reach the predetermined pressure is longer than a predetermined time in step S410, it may be determined that gas leaks from the gas supplying line.

Through the aforementioned technical solutions, the present disclosure provides the effects below.

According to the present disclosure, it is possible to remove a high pressure applicable to the gas charging line and/or the gas supplying line, thereby preventing a leak generable in the gas charging line and/or the gas supplying line. That is, in the present disclosure, it is possible to expect an effect in that there is no line, in which a high pressure is formed, except for an internal side of the high pressure vessel.

According to the present disclosure, a high pressure of the gas supplying line connected with the solenoid valve is removed for every start immediately after the charging, so that a pressure difference may be generated between a front end and a rear end of the solenoid valve, thereby naturally correcting a leak inside the solenoid valve. Accordingly, it is possible to improve stability and durability of the solenoid valve.

According to the present disclosure, a time taken for removing the high pressure in the gas charging line and/or the gas supplying line is measured, so that it is possible to determine whether gas leaks from the gas charging line and/or the gas supplying line connected with the high pressure vessel. Accordingly, it is possible to expect an effect in diagnosing an internal leak and a failure of the lines connected with the high pressure vessel.

The effect of the present disclosure is limited to the aforementioned effects. It shall be understood that the effect of the present disclosure includes all of the effects deducible from the descriptions below.

Other aspects and preferred embodiments of the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present disclosure will now be described in detail with reference to certain exemplary embodiments thereof illustrated in the accompanying drawings which are given herein below by way of illustration only, and thus are not limitative of the present disclosure, and wherein.

Figure 1:
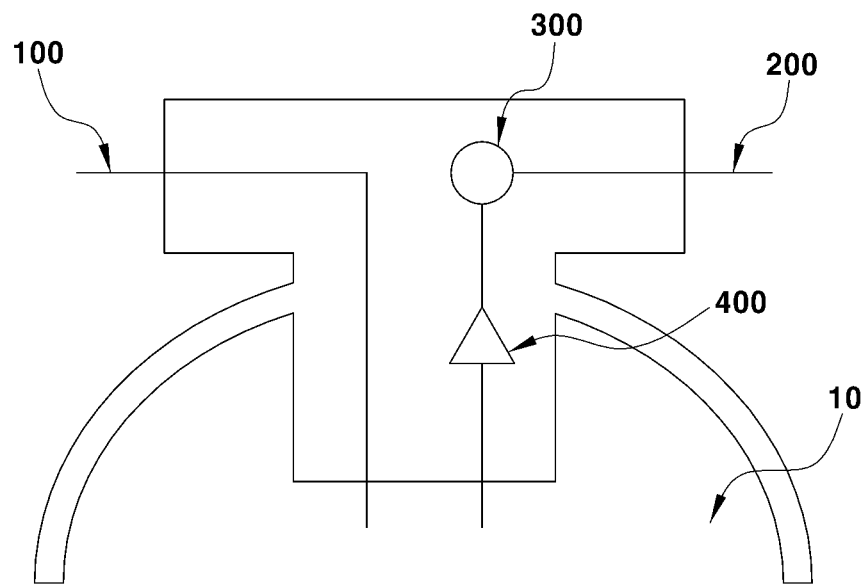
FIG. 1 is a diagram illustrating a configuration of a general on-tank regulator method.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an exemplary embodiment of the present disclosure will be described in more detail with reference to the accompanying drawings. The exemplary embodiment of the present disclosure may be modified in various forms, and the scope of the present disclosure is not interpreted as being limited to the exemplary embodiment described below. The present exemplary embodiment is provided for more completely explaining the present disclosure to those skilled in the art.

The terms " . . . part", " . . . unit", " . . . module", and the like described in the specification mean units for processing at least one function and operation and may be implemented by hardware components or software components and combinations thereof.

A fuel cell system mounted to a vehicle generally includes a fuel cell stack generating electric energy, a fuel supplying device supplying fuel (hydrogen) to the fuel cell stack, an air supplying device supplying oxygen that is an oxidizing agent in the air required for an electrochemical reaction to the fuel cell stack, a cooling system removing reaction heat of the fuel cell stack to the outside of the system and controlling an operation temperature of the fuel cell stack, a controller controlling opening/closing of a plurality of valves provided in the fuel cell system, and the like.

In the fuel cell system, a high pressure vessel for storing high pressure gas, preferably hydrogen, is a publicly known configuration, so that a detailed description thereof will be omitted below. Further, a regulator connectable to the high pressure vessel may refer to a component which decreases high pressure gas inside the high pressure vessel to a predetermined level. Accordingly, a pressure of gas may be relatively high at a front end of the regulator, and a pressure of gas may be relatively low at a rear end of the regulator.

The gas passing through the regulator is decompressed, so that expansion power of gas to the outside is relatively decreased, and thus the decompressed gas has a decreased possibility of a leak. Accordingly, when a component providable at the rear end of the regulator in a hydrogen supplying system of the fuel cell system is manufactured, it may be easy to manufacture the component in relation to a leak. That is, even though dangerousness of a leak situation of high pressure gas at the rear end of the regulator is not separately considered, it is possible to considerably decrease dangerousness of the leak.

In general, the fuel cell system may use hydrogen as fuel, and high pressure hydrogen gas of about 700 bars may be stored inside the high pressure vessel as fuel. Since the high pressure fuel (hydrogen) cannot be directly supplied to the stack, the high pressure fuel may be decompressed via the solenoid valve and the regulator and then supplied to the stack of the fuel cell. Typically, the high pressure fuel may be primarily decompressed by the regulator up to, preferably, pressure of 20 bars or less. The decompressed fuel may be secondarily decompressed by using a valve or an injector. When the decompressed fuel is secondarily decompressed, the fuel may be decompressed to, preferably, pressure of 4 bars or less. When the valve, not the injector, is used for the secondary decompression, the valve itself needs to have fuel tightness for pressure of around 20 bars, and further, a necessity to finely controlling a flow rate of fuel by the valve may be required.

In order to achieve the special object, the regulator and the solenoid valve may be integrated, and the solenoid valve and the high pressure vessel may also be integrated. Further, the high pressure vessel may be integrated with both the solenoid valve and the regulator. As an exemplary embodiment of the configuration, there may be an in-tank regulator method, and as another exemplary embodiment of the configuration, referring to FIG. 1, there may be an on-tank regulator method.

Particularly, the in-tank regulator method may refer to a method, in which, in a gas supplying line 200 of a high pressure vessel, a regulator is positioned between the high pressure vessel and a solenoid valve. Turning to FIG. 1, the on-tank regulator method may refer to a method, in which, in the gas supplying line 200, a solenoid valve 400 is positioned between a high pressure vessel 10 and a regulator 300. Both the two methods are common in that a high pressure state inside the high pressure vessel 10 is not applied to a supply flow path exposed to the outside of the high pressure vessel 10, that is, the outside of the high pressure vessel 10 closely providable and connectable to a stack, and may have more excellent effect than that of the related art.

However, despite the aforementioned methods, it is impossible to fundamentally remove the application of high pressure to the gas charging line 100 between a gas charging station, particularly, a receptacle of a hydrogen charging station, and the high pressure vessel 10. Particularly, gas (hydrogen) is stored in a high pressure state in the high pressure vessel 10 of the fuel cell system and the charging is performed by a pressure difference between the charging station and the high pressure vessel 10, so that it is fundamentally impossible to remove the high pressure state of the gas charging line 100 during the charging.

Accordingly, the present disclosure intends to suggest a structure for minimizing a region, in which the gas charging line 100 and/or a gas supplying line 200 is maintained in a high pressure state, immediately after the charging, and a control method thereof. Hereinafter, a structure of a fuel cell system, in which a high pressure line of a hydrogen supplying system is removed, will be described in detail. Further, in the case of the in-tank regulator 300, in order to completely separate the gas charging line 100 and the gas supplying line 200, a separate bypass (bent line) and the like need to be provided, and thus, in an exemplary embodiment of the present disclosure, the high pressure vessel 10 in the on-tank regulator method may be used. Further, the "gas supplying line 200" referred in the present disclosure means a line between the high pressure vessel 10 and the stack, and may mean a plurality of pipes forming a flow path (passage), and does not simply mean one member or component. Similarly, the "gas charging line 100" referred in the present disclosure means a line between the high pressure vessel 10 and the gas charging station, and may mean a plurality of pipes forming a flow path (passage), and does not simply mean one member or component.

Figure 2:
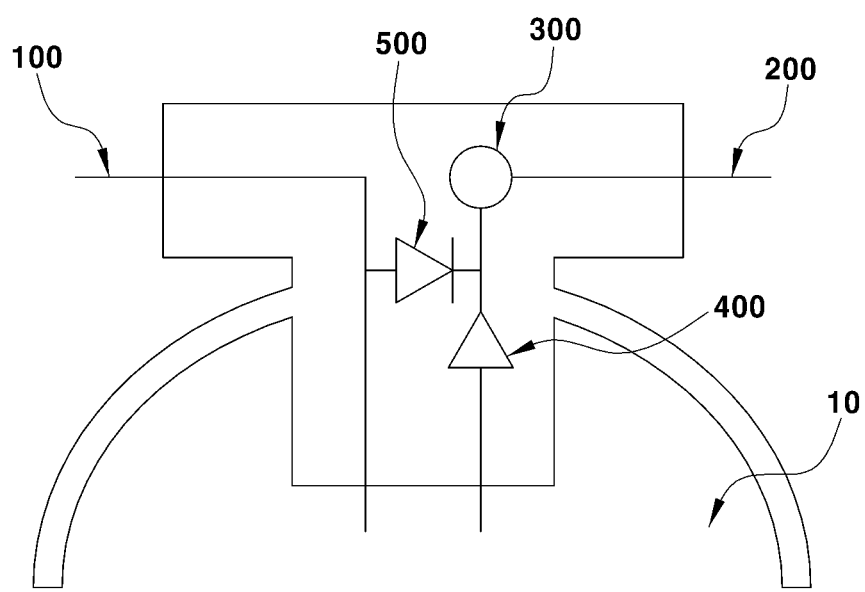
FIG. 2 is a diagram illustrating a configuration of an on-tank regulator method according to an exemplary embodiment of the present disclosure.

FIG. 2 is a diagram illustrating an internal configuration of an on-tank regulator 300 according to an exemplary embodiment of the present disclosure. Further, FIG. 3 is a diagram illustrating a connection relation between configurations of the hydrogen supplying system including a gas charging line 100 and a gas supplying line 200 of the fuel cell system according to an exemplary embodiment of the present disclosure.

Figure 3:
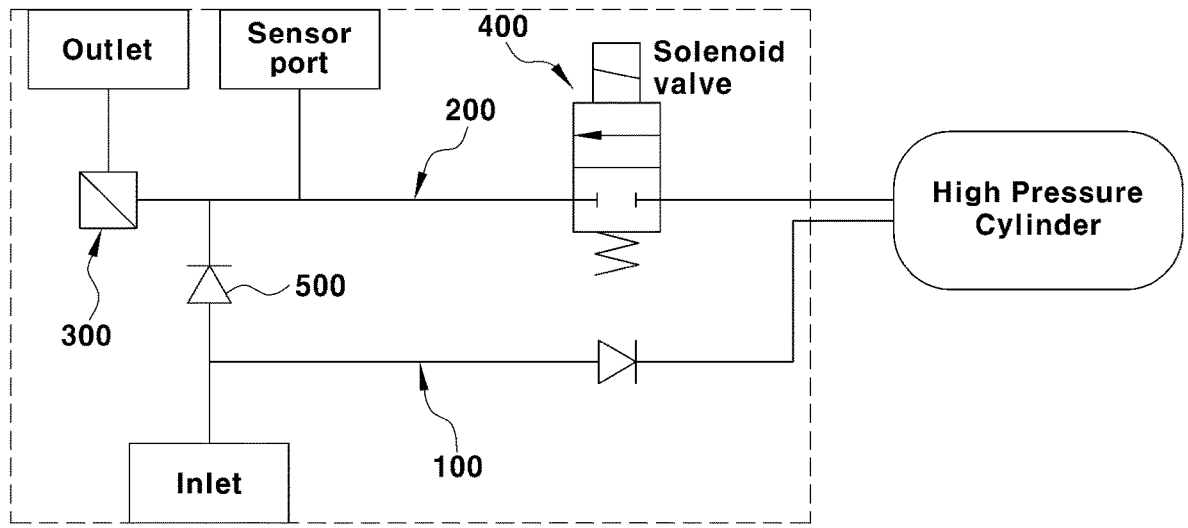
FIG. 3 is a diagram illustrating a connection relation between configurations of a hydrogen supplying system and a connection relation of check valves of a fuel cell system according to an exemplary embodiment of the present disclosure.

Referring to FIGS. 2 and 3, the present disclosure may include the gas charging line 100 and the gas supplying line 200 connected with the high pressure vessel 10. Preferably, the present disclosure may include the gas charging line 100 connecting a gas charging station, particularly, a receptacle of a gas charging station, and one side of an inlet of a high pressure vessel 10, and the gas supplying line 200 connecting the one side of the inlet of the high pressure vessel 10 and a hydrogen inlet of a stack of a fuel cell. Further, according to FIG. 2, the present disclosure may include the regulator 300 at one point of the gas supplying line 200. The regulator 300 is a configuration for decompression as described above, and is a configuration generally adoptable in the hydrogen supplying system of the fuel cell system, so that a detailed description thereof will be omitted below.

In the present disclosure, a solenoid valve 400 may be provided in the gas supplying line 200. The solenoid valve 400 according to an exemplary embodiment of the present disclosure is a valve drivable with electromagnetic force, and a normally-closed (NC) type valve may be used. An opening degree of the solenoid valve 400 is controlled in proportion to an applied current, so that the solenoid valve 400 may control a flow rate of hydrogen, which may be supplied from the high pressure vessel 10 to the stack. As an exemplary embodiment, in the present disclosure, the solenoid valve 400 may be provided between the regulator 300 and the high pressure vessel 10. That is, the solenoid valve 400 may be provided at one point on the gas supplying line 200 between the regulator 300 and the high pressure vessel 10. In one embodiment, no intermediate components may be present along the gas supplying line 200 between the solenoid valve 400 and the regulator 300.

Turning to FIG. 3, the present disclosure may include a bypass line connecting one point of the gas supplying line 200 and one point of the gas charging line 100. Particularly, the bypass line may connect one point between the solenoid valve 400 and the regulator 300 of the gas supplying line 200 and one point between the receptacle of the charging station and a filling device. Accordingly, when gas may flow through the bypass line, a pressure of the gas supplying line 200 between the solenoid valve 400 and the regulator 300 and a pressure of the gas charging line 100 between the receptacle of the charging station and the filling device may be equal to each other.

In the present disclosure, a check valve 500 may be provided at one point on the bypass line. According to an exemplary embodiment, the check valve 500 may be provided in the bypass line connecting one point of the gas supplying line 200 between the regulator 300 and the solenoid valve 40 and one point of the gas charging line 100. That is, the check valve 500 may be provided between the gas supplying line 200 and the gas charging line 100. The check valve 500 in the present disclosure is a one-way valve, and may mean a valve, by which even though the valve is opened, gas is capable of moving from one side to the other side, but gas cannot flow backward from the other side to one side. Preferably, as illustrated in FIG. 3, the check valve 500 of the present disclosure may be a valve formed so that gas is capable of moving (flowing) only in a direction from the gas supplying line 200 to the gas charging line 100. That is, in the present disclosure, the gas charging line 100 and the gas supplying line 200 may be connected in a single direction, that is, from the gas supplying line 200 to the gas charging line 100.

In the meantime, the present disclosure may include a pressure sensor for measuring pressure of gas (hydrogen) passing through the gas supplying line 200 on the gas supplying line 200 between the regulator 300 and the solenoid valve 400. Particularly, a sensor port may be present in the gas supplying line 200 between the regulator 300 and the solenoid valve 400 existing inside the high pressure vessel 10. Further, the pressure sensor may be fastened to a position corresponding to the sensor port inside the high pressure vessel 10 outside of the high pressure vessel 10. The pressure sensor outside of the high pressure vessel 10 is fastened to the sensor port inside the high pressure vessel 10, so that a gap, through which the gas supplying line 200 between the solenoid valve 400 and the regulator 300 may communicate with the outside, may be generated. Further, there is a possibility that gas leaks through the gap between the pressure sensor and the sensor port. Further, when the pressure of gas of the gas supplying line 200 inside the high pressure vessel 10, in which the sensor port is positioned, is high, the possibility of the leak of the internal gas of the gas supplying line 200 may also be increased. In one embodiment, no intermediate components may be present along the gas supplying line 200 between the sensor port of the pressure sensor and the regulator 300, and no intermediate components may be present along the gas supplying line 200 between the sensor port of the pressure sensor and the solenoid valve 400.

Turning to FIG. 3, according to an exemplary embodiment of the present disclosure, a part of the regulator 300, the solenoid valve 400, the gas charging line 100, and/or the gas supplying line 200 is formed inside the high pressure vessel 10, so that the high pressure vessel 10 needs to be fastened with another member at an inlet point and an outlet point illustrated in FIG. 3. That is, in order to connect the high pressure vessel 10 and a flow path forming the gas charging line 100 and/or the gas supplying line 200 outside the high pressure vessel 10, the fastening between the high pressure vessel 10 and the passage (flow path) may be required at one end of the high pressure vessel 10.

In the meantime, the plurality of pipes forming the respective lines inside the fuel cell system needs to be fastened with another member or component at both ends of each pipe. Accordingly, it can be seen that when a high pressure is applied to one pipe, two leak points are formed at fastening points of both ends. According to the exemplary embodiment of the present disclosure, the plurality of leak points may be generated in the flow path on the gas supplying line 200 between the stack and the regulator 300, and the plurality of leak points may also be generated in the flow path on the gas charging line 100 between the gas charging station and the high pressure vessel 10. Further, when the check valve 500 is provided, the leak point may also be generated in the flow path of the gas charging line 100 between the gas charging station and the check valve 500.

Accordingly, a control method and a driving method of the fuel cell system, in which a high pressure line of the hydrogen supplying system is removed, according to an exemplary embodiment of the present disclosure for preventing gas from leaking at the leak point generable at the aforementioned point will be described below in detail.

Figure 4:
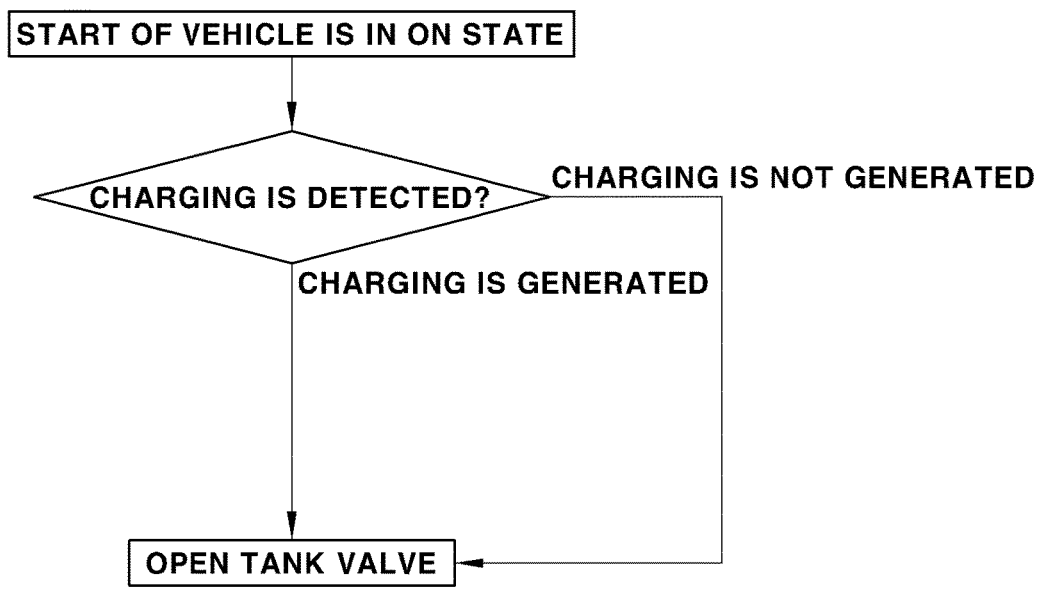
FIG. 4 is a flowchart illustrating a charging detecting logic according to the ignition of a vehicle in the related art.

FIG. 4 is a diagram illustrating a relation between charging or discharging and an opening of the solenoid valve 400 in a vehicle, to which the fuel cell system is mountable, according to the related art. Referring to FIG. 4, in the related art, it can be seen that when the ignition of the vehicle is in an "on" state, whether the vehicle is charged is detected, but regardless of the completion of the charging, the solenoid valve 400 and/or the regulator 300 is opened.

Figure 5:
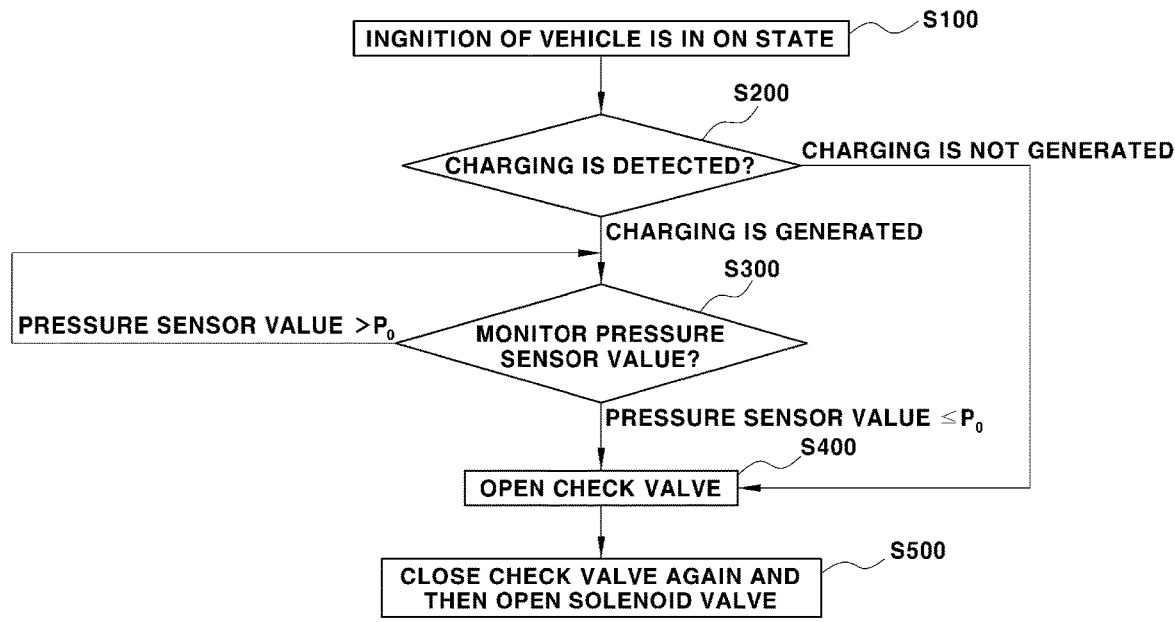
FIG. 5 is a flowchart illustrating a logic for detecting charging according to the ignition of a vehicle and determining whether a check valve is opened according to another exemplary embodiment of the present disclosure.

In the meantime, FIG. 5 is a flowchart illustrating a method of driving the fuel cell system according to an exemplary embodiment of the present disclosure. According to FIG. 5, in the present disclosure, whether the ignition of a vehicle, to which the fuel cell system is mountable, is in an "on" state may be first determined in step S100. Then, whether the charging is performed before the vehicle, to which the fuel cell system is mountable, starts may be determined in step S200. Particularly, whether the high pressure vessel 10 of the vehicle is high pressure charged with gas (hydrogen) from the gas charging station may be determined.

Figure 6:
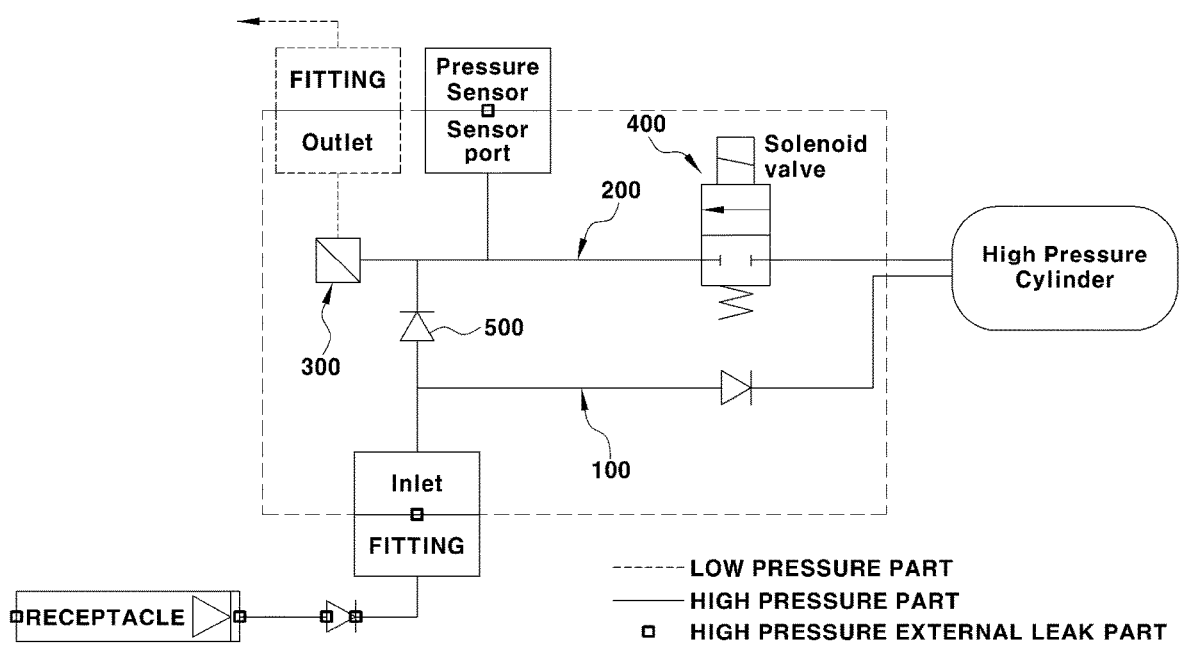
FIG. 6 is a diagram illustrating the case where a high pressure or a lower pressure is formed in each line and configuration immediately after a vehicle mounted with the fuel cell system is charged according to another exemplary embodiment of the present disclosure.

FIG. 6 is a diagram illustrating a high pressure or low pressure state of each of the gas supplying line 200 and/or the gas charging line 100 immediately after the high pressure charging is performed. Further, FIG. 6 illustrates a point, at which gas may leak according to the high pressure charging. Referring to FIG. 6, in can be seen that according to the charging of the high pressure gas, all of the lines of the hydrogen supplying system, except for the rear end of the regulator 300, that is, the gas supplying line 200 connected from the regulator 300 to the stack, may be exposed to a high pressure state. At the time, at which the present disclosure is carried out, the regulator 300 is always in a closed state, and only the pressure of the charged high pressure gas may be larger than elastic force of a plunger of the solenoid valve 400. Accordingly, the charged high pressure gas may push the plunger of the valve into the inside of the valve, and this may be similar to the opened state of the valve. Accordingly, the high pressure state may be formed even in the gas supplying line 200 provided with the solenoid valve 400.

Then, the pressure sensor, which is fastened to the gas supplying line 200 between the regulator 300 and the solenoid valve 400 to measure pressure, may measure a pressure of the gas supplying line 200 between the regulator 300 and the solenoid valve 400 in step S300.

In this case, when the measured pressure exceeds a predetermined pressure $P_0$, the check valve 500, which may be provided at the bypass flow path connecting the gas supplying line 200 and the gas charging line 100, may be opened. That is, the check valve 500 may be opened according to the pressure of the gas supplying line 200 (the gas supplying line 200 between the regulator 300 and the solenoid valve 400) in step S400. In this case, the predetermined pressure $P_0$ may be set based on a minimum usage pressure value of an inlet end of the regulator 300, that is, the side of the solenoid valve 400 between both ends of the regulator 300. According to an exemplary embodiment, the predetermined pressure $P_0$ may have a value of about 2 MPa.

The check valve 500 is opened, so that the pressure of the bypass line may be decompressed, and further, the pressure of the gas supplying line 200 and/or the gas charging line 100 connected with the bypass line may also be decompressed.

Figure 7:
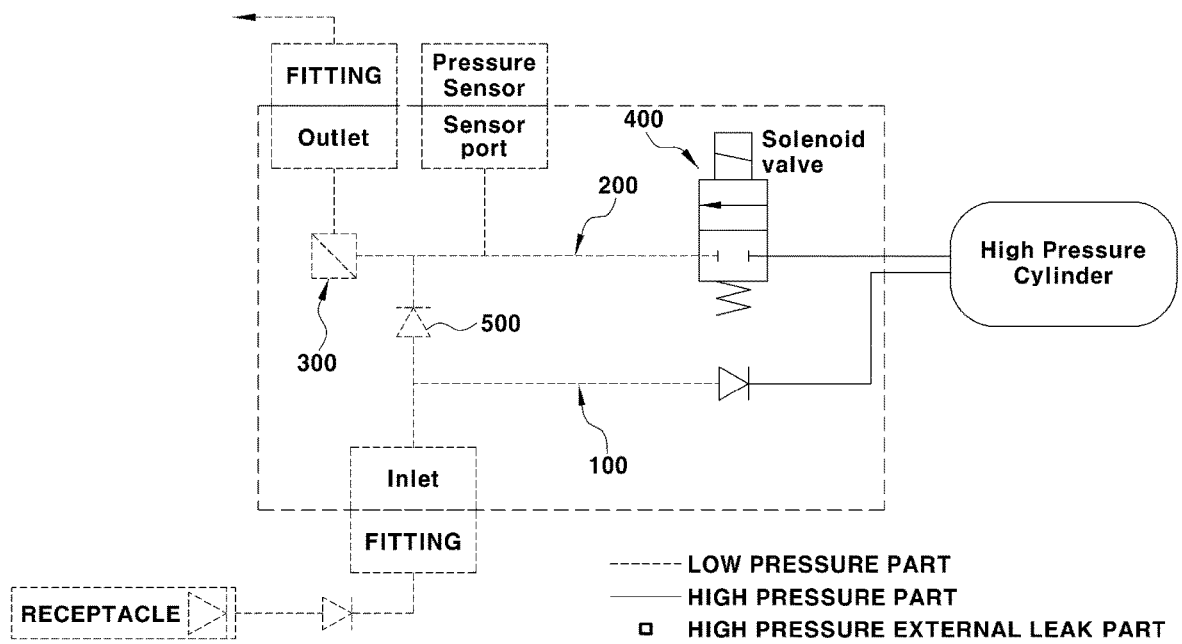
FIG. 7 is a diagram illustrating the case where a high pressure or a lower pressure is formed in each line and configuration after a check valve is opened according to another exemplary embodiment of the present disclosure.

FIG. 7 illustrates a high pressure or low pressure state of each line after the check valve 50 is opened according to an exemplary embodiment of the present disclosure. Similar to FIG. 6, the regulator 300 may be in a closed state. Accordingly, the pressure of the gas supplying line 200 connected to the rear end of the regulator 300, that is, the stack between both ends of the regulator 300, may be still maintained in a low pressure state. Only, in FIG. 7, elastic force of the solenoid valve 400 may be larger than pressure of gas applied to the inlet of the solenoid valve 400. Accordingly, a spring of the solenoid valve 400 makes the plunger be in close contact with a sheet of the valve, so that the solenoid valve 400 may also maintain a closed state. Further, the filling device may also prevent gas from flowing backward from the high pressure vessel 10. Accordingly, the pressure of the gas supplying line 200 between the regulator 300 and the solenoid valve 400, the bypass line, and the gas charging line 100 between the filling device and the gas charging station may be decompressed to the low pressure state. Accordingly, all of the lines of the hydrogen supplying system of the fuel cell system, except for the lines between the solenoid valve 400 and the high pressure vessel 10, and between the filling device and the high pressure vessel 10, may maintain the low pressure state.

In the present disclosure, a difference in pressure between the front end and the rear end based on the solenoid valve 400 is increased, so that a leak inside the solenoid valve 400 may be automatically corrected. Three internal leak points may generally exist in the solenoid valve 400. Particularly, two leak points may exist in a solenoid operating part and one leak point may exist in a filling part (finishing part). However, the leak points inside the solenoid valve 400 may have a structure, in which the leak is naturally corrected by a pressure difference between the front end and the rear end of the solenoid valve 400. That is, one configuration compresses another configuration by the pressure difference, so that a gap or a misalignment between both configurations may be corrected.

When the check valve 500 is opened, a time taken for decompressing the pressure of the gas supplying line 200 from the high pressure to a low pressure, particularly, from about 70 MPa to about 2 MPa, may be measured in step S410. It is possible to measure a time taken for decompressing the gas supplying line 200 and/or the gas charging line 100, in which the high pressure is formed, to a low pressure. When the time taken for the gas supplying line 200 and/or the gas charging line 100 to reach the predetermined pressure $P_0$ is a predetermined time or longer, it may be determined that gas leaks at one point of the gas supplying line 200. The reason is that when the gas leaks at one point of the gas supplying line 200 or the gas charging line 100 extended from the high pressure vessel 10, even though the check valve 500 is opened, the decompression is not performed or a speed of the decompression is low by the leak of the high pressure gas. Accordingly, the present disclosure may remove the high pressure line of the gas charging line 100 and even determine whether a leak is generated inside the gas charging line 100 and/or the gas supplying line 200.

In the meantime, when a predetermined time elapses after the check valve 500 is opened, the check valve 500 may be closed again, and the solenoid valve 400 may be opened after the check valve 500 is closed again in step S500. Particularly, the predetermined time may be set as a time taken for decompressing the pressure of the gas supplying line 200 from about 70 MPa to about 2 MPa.

Figure 8:
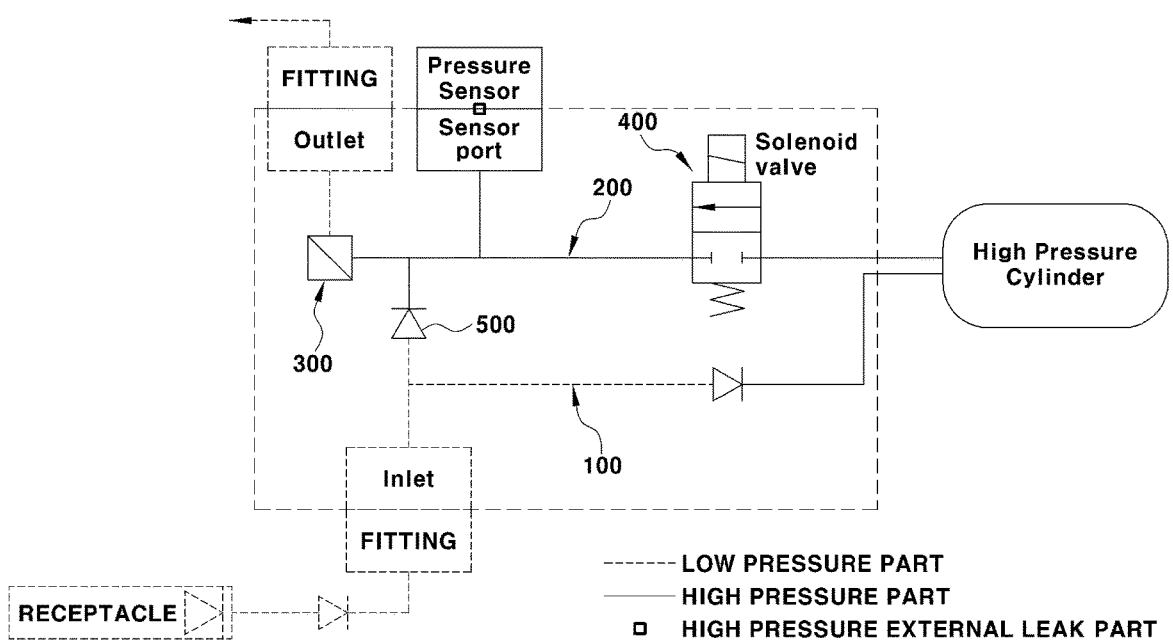
FIG. 8 is a diagram illustrating the case where a high pressure or a lower pressure is formed in each line and configuration after a check valve is closed again and then a solenoid valve is opened according to another exemplary embodiment of the present disclosure.

FIG. 8 is a diagram illustrating the pressure of each configuration and each line in the state where the check valve 500 is opened and then is closed again, and then the solenoid valve 400 is opened. According to FIG. 8, the check valve 500 is closed, so that the bypass line may be divided into a high pressure line and a low pressure line based on the check valve 500. Particularly, the line in the bypass line connected with the gas supplying line 200 may maintain a high pressure state, and the line in the bypass line connected with the gas charging line 100 may maintain a low pressure state.

The solenoid valve 400 is in the opened state and the regulator 300 maintains the closed state, so that the gas supplying line 200 between the solenoid valve 400 and the regulator 300 may maintain a high pressure state. However, the gas supplying line 200 in the high pressure state may be formed inside the high pressure vessel 10, so that a problem related to the exposure of the high pressure line to the outside may not be generated. Further, in FIG. 8, compared to FIG. 6, the leak point, which is generable between the gas charging station (particularly, the receptacle of the charging station) and the check valve 500 and the filling device is removed, thereby decreasing the number of leak points of the hydrogen supplying system of the fuel cell system.

Figure 9:
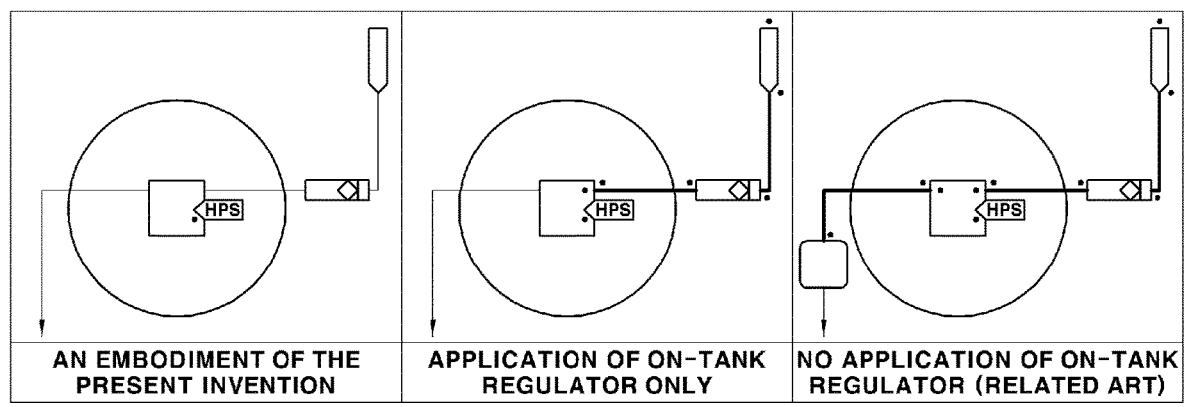
FIG. 9 is a diagram illustrating a comparison of the number of leak points and the number of high pressure lines between the on-tank regulator method according to the present disclosure and the related art.

FIG. 9 is a diagram schematically illustrating the number and the positions of high pressure lines (high pressure pipe parts) and leak points (high pressure leak points), which may be formed in each of the case where the present technology is applied, the case where only the on-tank regulator 300 is applied, and the general case where the on-tank regulator 300 is not applied, to the hydrogen supplying system of the fuel cell system. As described above, one line (pipe) needs to be fastened to another member at both ends thereof, so that it can be seen that when a high pressure is applied to one line, two leak points are formed. In each case, two leak points may be generated in the receptacle positioned at a right upper end of the gas charging line 100, two leak points may be generated in a line check, and two leak points may be generated at a point, at which the gas charging line 100 is connected with the high pressure vessel 10. Further, the leaks point may also be generated at a point, at which the gas supplying line 200 is connected with the high pressure vessel 10. Further, when the regulator 300 is separately provided, two leak points may be additionally generated in the pipe (line) between the high pressure vessel 10 and the regulator 300.

The center cylindrical high pressure vessel 10 and a quadrangular end portion of the high pressure vessel 10 may be suggested in FIG. 9. Further, the gas charging line 100 may be illustrated at a right side and the gas supplying line 200 may be illustrated at a left side. Particularly, FIG. 9 illustrates the configuration schematically illustrating the receptacle of the gas charging station at the right upper end, the line check at the right side, and the regulator 300 at a left lower end. Further, a line indicated with a thick solid line may be a line in a high pressure state, and a line indicated with a thin solid line may be a line in a low pressure state. Further, in each case, a region marked with a point in the drawing is a region, in which a leak point may be formed. The number of leak points generable in the case where each system is applied, and the number of pipes, to which a high pressure is applied, are organized in the table below.

| Method of hydrogen supplying system of fuel cell system | Exemplary embodiment of the present invention | The case where only the on-tank regulator is applied | The case where the on-tank regulator is not applied |
| --- | --- | --- | --- |
| The number of leak points | 1 | 7 | 10 |
| The number of pipes, to which high pressure is applied | 0 | 2 | 3 |

Accordingly, compared to the related art and the case where only the on-tank regulator 300 is applied, in the present invention, the high pressure lines (particularly, the number of pipes, to which a high pressure is applied, and the number of leak points) are removed (decreased), so that the fastening parts, to which the high pressure is applied, are decreased, thereby remarkably decreasing the number of leak points, in which a leak is generable, and improving stability of the fuel cell system.

To sum up, the core spirit of the present disclosure is that the present disclosure includes the bypass line connecting the gas supplying line between the solenoid valve and the regulator and one point of the gas charging line, and includes the check valve movable in one direction on the bypass line, so that the check valve is opened after the charging, thereby removing a high pressure state of the gas supplying line between the solenoid valve and the regulator.

That is, it is noted that the present disclosure is characterized in that after the high pressure state is removed, the high pressure is applied to the line between the solenoid valve and the high pressure vessel and the line between the filling device and the high pressure vessel, so that the high pressure leak points exposed to the outside are minimized.

In the above description, the exemplary embodiments of the present disclosure have been described, but those with ordinary skill in the art to which the present disclosure pertains may variously modify and alter the present disclosure without departing from the spirit of the present disclosure disclosed in the claims by adding, changing, and deleting constituent elements, and the modification and alteration also belong to the scope of the present disclosure.

In the description of the exemplary embodiments of present disclosure, a detailed description of known configurations or functions incorporated herein will be omitted when it is determined that the detailed description may make the subject matter of the present disclosure unclear. The terms which are described above are terms defined in consideration of the functions in the exemplary embodiments of the present disclosure, and may be changed according to intentions or practices of users and operators. Therefore, the definitions should be made based on the entire contents of the present specification. Accordingly, the detailed description of the disclosure does not intend to limit the present disclosure to the exemplary embodiments, and it shall be construed that the accompanying claims include other exemplary embodiments.

In the foregoing, the present disclosure has been described with reference to the exemplary embodiment(s) illustrated in the drawings, which are, however, illustrative, and those skilled in the art would understand that various modifications may be possible, and the entirety or some of the aforementioned exemplary embodiment(s) may be selectively combined and configured. Accordingly, the actual scope of the present disclosure shall be determined by the technical spirit of the appended claims.

What is claimed is:

1. A fuel cell system, comprising:
a gas charging line disposed between a gas charging station and a pressure vessel charged with gas from the gas charging station, and a gas supplying line disposed between the pressure vessel and a stack;
a regulator disposed in the gas supplying line;
a solenoid valve disposed in the gas supplying line between the regulator and the pressure vessel; and
a check valve disposed in a bypass line connecting one point of the gas supplying line, which is located between the regulator and the solenoid valve, and one point of the gas charging line,
wherein the check valve is a one-way valve configured to allow gas passing through the check valve to be movable only in a direction from the gas supplying line to the gas charging line, and a pressure of the gas supplying line connected with the solenoid valve is reduced when the check valve is opened, for every start immediately after charging, so that a pressure difference is generated between a front end and a rear end of the solenoid valve, thereby correcting a leak inside the solenoid valve, and
wherein no intermediate components are present along the gas supplying line between the solenoid valve and the regulator.

2. The fuel cell system of claim 1, wherein after the pressure vessel is charged with gas, the check valve is opened and then, in sequence, closed before the solenoid valve is opened.

3. The fuel cell system of claim 1, further comprising:
a first leak point, wherein a leak is able to happen in a flow path of the gas supplying line between the stack and the regulator.

4. The fuel cell system of claim 1, further comprising:
a second leak point, wherein a leak is able to happen in a flow path of the gas charging line between the gas charging station and the check valve.

5. A fuel cell system, comprising:
a gas charging line disposed between a gas charging station and a pressure vessel charged with gas from the gas charging station, and a gas supplying line disposed between the pressure vessel and a stack;
a regulator disposed in the gas supplying line;
a solenoid valve disposed in the gas supplying line between the regulator and the pressure vessel;
a check valve disposed in a bypass line connecting one point of the gas supplying line, which is located between the regulator and the solenoid valve, and one point of the gas charging line; and
a pressure sensor fastened to the gas supplying line between the regulator and the solenoid valve,
wherein the check valve is a one-way valve configured to allow gas passing through the check valve to be movable only in a direction from the gas supplying line to the gas charging line, and a pressure of the gas supplying line connected with the solenoid valve is reduced when the check valve is opened, for every start immediately after charging, so that a pressure difference is generated between a front end and a rear end of the solenoid valve, thereby correcting a leak inside the solenoid valve, and
wherein no intermediate components are present along the gas supplying line between a sensor port of the pressure sensor and the regulator and along the gas supplying line between the sensor port of the pressure sensor and the solenoid valve.

* * * * *